United States Patent
Lam

(10) Patent No.: US 9,310,584 B2
(45) Date of Patent: Apr. 12, 2016

(54) LENS DRIVING APPARATUS

(71) Applicant: Sunming Technologies (HK) Limited, Hong Kong (HK)

(72) Inventor: Sio Kuan Lam, Hong Kong (HK)

(73) Assignee: Sunming Technologies (HK) Limited, Hong Kong (HK)

( * ) Notice: Subject to any disclaimer, the term of this patent is extended or adjusted under 35 U.S.C. 154(b) by 0 days.

(21) Appl. No.: 14/289,651

(22) Filed: May 29, 2014

(65) Prior Publication Data

US 2015/0070791 A1    Mar. 12, 2015

Related U.S. Application Data

(60) Provisional application No. 61/876,239, filed on Sep. 11, 2013.

(51) Int. Cl.
  *G02B 7/02* (2006.01)
  *G02B 7/04* (2006.01)
  *G02B 7/00* (2006.01)

(52) U.S. Cl.
  CPC *G02B 7/04* (2013.01); *G02B 7/005* (2013.01); *G02B 7/008* (2013.01)

(58) Field of Classification Search
  CPC ..... G02B 7/023; G11B 7/0933; G11B 7/0935
  USPC .......................... 359/814, 822–824, 829, 830
  See application file for complete search history.

(56) References Cited

U.S. PATENT DOCUMENTS 5,939,804 A *  8/1999  Nakao et al. ............... 310/12.14
7,400,463 B1    7/2008  Wu
7,649,703 B2    1/2010  Shiraki et al.
2009/0268310 A1* 10/2009 Honjo et al. ................. 359/698
2011/0090580 A1 4/2011  Shiraki et al.
2012/0154938 A1 6/2012  Ohishi et al.

FOREIGN PATENT DOCUMENTS

CN    200944308 Y    9/2007
DE    19805094 A1    9/1998

OTHER PUBLICATIONS

Chien-Sheng Liu and Psang Dain Lin, A miniaturized low-power VCM actuator for auto-focusing applications, Optics Express, Feb. 8, 2008, pp. 2533-2540, vol. 16, No. 4.
Psang Dain Lin and Chien-Sheng Liu, Miniaturized auto-focusing VCM actuator with zero holding current, Optics Express 17 (12): 9754-9763 2009.
Search Report of counterpart European Patent Application No. 14184444.9 issued on Jan. 21, 2015.

* cited by examiner

*Primary Examiner* — William Choi

(57) ABSTRACT

A lens driving apparatus includes a housing, a lens holder mounted on a base of the housing and moveable along an optical axis, a stationary guide member provided on the base, and a moveable guide member provided on and moveable with the lens holder, wherein the moveable guide member is frictionally engaged with the stationary guide member and slidable therealong when the lens holder is activated. The apparatus further include a plurality of magnets with magnetization direction lying on a plane perpendicular to the optical axis, a coil disposed adjacent and parallel to the magnets, and a position encoder provided on the lens holder or the support for close loop control of the movement of the lens holder.

19 Claims, 10 Drawing Sheets

LENS DRIVING APPARATUS

CROSS-REFERENCE TO RELATED APPLICATIONS

This application claims the benefit of U.S. Provisional Patent Application No. 61/876,239, filed Sep. 11, 2013, the entire content of which is hereby incorporated by reference.

FIELD OF THE TECHNOLOGY

The present application relates generally to a lens driving apparatus, and particularly to a lens driving apparatus having a position encoder for close loop control, a guiding mechanism to guide the moving direction of the lens, and a planar type coil-magnet configuration.

BACKGROUND

Voice coil motor (VCM) is the mainstream technology to linearly drive a lens to achieve autofocus function of a camera module in a mobile phone. Many different VCM designs have been invented to provide such lens driving capability. Such VCM designs or lens driving apparatus comprise a pair of leaf springs, magnets, coil, and yoke. However, VCMs disclosed by the mentioned patents and patent application do not comprise a position sensor or a position encoder, which can measure the lens position and feedback a signal or an electronic signal for lens position control. In fact, those disclosed VCMs control the lens position by precisely controlling the operating current of the VCM to achieve a mechanical force balance of the electromagnetic force and elastic force of springs. Such balance is done naturally without knowing the lens position. Therefore, the actual lens position will be varying for various camera postures for the same operating current. Furthermore, due to the spring-mass structure, such VCM will always create a lens position oscillation when the lens moves. Such position oscillation will cause blurring of images during focusing.

To solve the above problem, a position sensor or encoder is introduced into VCM. The output signal of the position encoder is sent to a position control driver integrated circuit (IC), which in turn drives the lens to the expected position. Such VCM includes a Hall element (or Hall sensor) used for lens position measurement. Such VCM operating mechanism is described as follows. VCMs are connected to an electronic circuit (usually an IC) which is used to receive the lens position signal from the Hall sensor. The position signal is analyzed by the electronic circuit and is used to find out the actual physical position. The electronic circuit then sends out a driving signal to drive the lens to move. During the lens movement, the Hall element keeps sending back the position signal, which is continuously analyzed to get the real physical position information. Based on the position information, the electronic circuit will determine to stop sending out the driving signal when the lens arrives the expected position. Otherwise, the circuit will continuously send out the driving signal to drive the lens to move. Such control loop is called close-loop control. Recently, such close-loop control VCM is getting more and more market traction due to its fast response, lower power consumption, and lower cost.

The above description of the background is provided to aid in understanding a lens driving apparatus, but is not admitted to describe or constitute pertinent prior art to the lens driving apparatus, or consider the cited documents as material to the patentability of the claims in the present application.

SUMMARY

According to one aspect, there is provided a lens driving apparatus including a base having at least one stationary guide member, a moveable guide member provided on and moveable with a lens holder, a coil attached to the lens holder, a magnet holder holding a plurality of magnets with magnetization direction lying on a plane perpendicular to an optical axis defined by the lens holder, and a position encoder attached to the lens holder. The magnet holder can be fixed on the base, and the moveable guide member on the lens holder can be engaged with the stationary guide member on the base, and slidable therealong in a direction defined by the guide members. The position encoder can send out a signal with respect to the change of the position of the lens holder.

According to another aspect, there is provided a lens driving apparatus including a support, a lens holder engaged with the support through a guide mechanism and moveable along an optical axis, a stationary guide member of the guide mechanism provided on the support, a moveable guide member of the guide mechanism provided on and moveable with the lens holder and engaged with the stationary guide member and slidable therealong, and a position encoder to reflect the change of the position of the lens holder.

In one embodiment, the stationary guide member can be a guiding shaft having one end attached to the support, and the moveable guide member can be a guiding hole formed on the lens holder through which the guiding shaft slides.

In one embodiment, the moveable and stationary guide members may include an elongated projection and a mating groove. The elongated projection and the groove may have V-shaped or dovetail-shaped cross section.

In one embodiment, the stationary guide member can be a central cylindrical bore formed on the support, and the moveable guide member can be a tubular portion provided on the moveable lens holder.

The lens driving apparatus may further include a plurality of magnets with magnetization direction lying on a plane perpendicular to the optical axis, and a coil disposed adjacent and parallel to the magnets, whereby electromagnetic force is generated to drive the lens holder upwards or downwards along the optical axis. The plurality of magnets can be mounted on one of the lens holder and the support, and the coil can be mounted on the other one of the lens holder and the support.

In one embodiment, the lens driving apparatus may include four magnets disposed respectively along four sides of a rectangular magnet holder. The plurality of magnets may be disposed in a circular configuration, each magnet being in the shape of an arc.

In one embodiment, the moveable guide member can be a conductive ring being fixed in a guiding hole formed on the lens holder, and the stationary guide member can be a conductive shaft having one end connected to an electrode mounted on the support and the other end received in the conductive ring which in turn is connected to the coil.

In one embodiment, a portion of the lens holder between an inner sidewall of the guiding hole and an outer sidewall of the lens holder can be cut out so that a portion of an outer sidewall of the conductive ring is exposed to thereby facilitate soldering connection of the conductive ring to the coil mounted around the outer sidewall of the lens holder.

The lens driving apparatus may further include a resilient conductive electrode, one end of the resilient conductive electrode being fixedly attached to a vertical wall formed perpendicularly on the lens holder, and the other end is a free end adapted to be bent away from the guiding hole after the conductive shaft is inserted therein, and bias against the conductive shaft by a biasing force generated by the bent resilient conductive electrode.

The plurality of magnets can be mounted on one of the lens holder and the support, and the position encoder can be mounted on the other one of the lens holder and the support for close loop control of the movement of the lens holder.

In one embodiment, the conductive ring can be cylindrical in shape, or cylindrical in shape with an outwardly extending annular flange formed at one end thereof, or in the shape of a donut.

In one embodiment, a portion of the lens holder between an inner sidewall of the guiding hole and an outer sidewall of the lens holder can be cut out to reduce the contact area between the guiding hole and the guiding shaft, reduce the weight of the lens holder, and hence reduce electric current needed to drive the lens holder.

According to a further aspect, there is provided an electronic image-capturing device including the lens driving apparatus disclosed in the present application.

Although the lens driving apparatus is shown and described with respect to certain embodiments, it is obvious that equivalents and modifications will occur to others skilled in the art upon the reading and understanding of the specification. The lens driving apparatus in the present application includes all such equivalents and modifications, and is limited only by the scope of the claims.

BRIEF DESCRIPTION OF THE DRAWINGS

Specific embodiments of the lens driving apparatus will now be described by way of example with reference to the accompanying drawings wherein.

DETAILED DESCRIPTION

Figure 1:
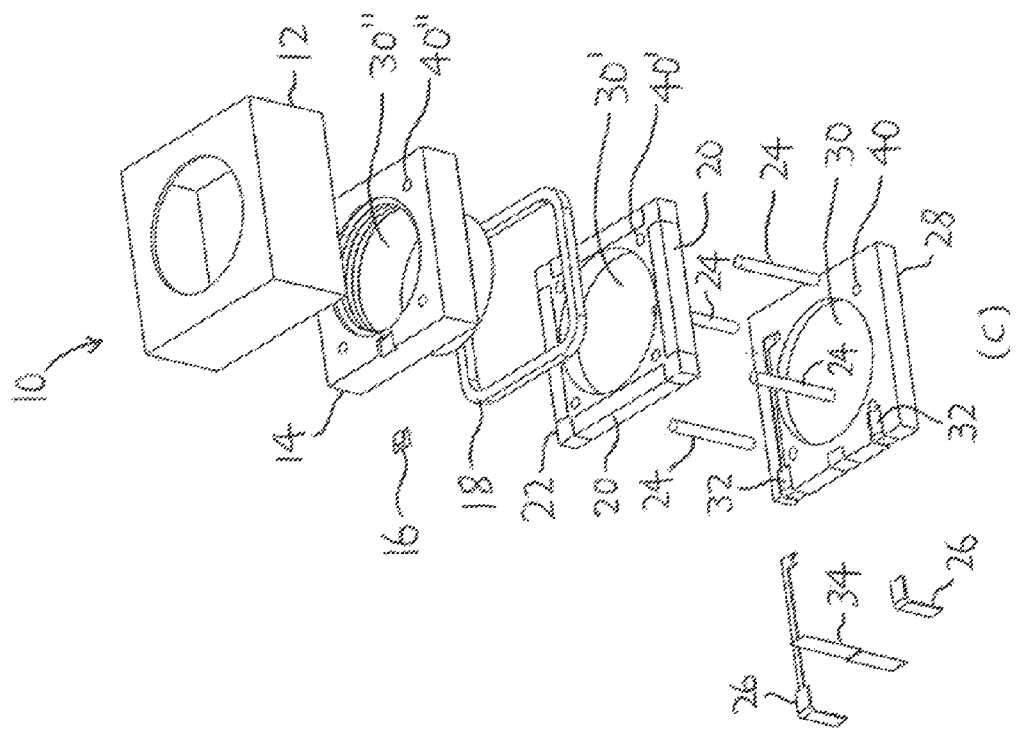
FIG. 1(a) is a perspective view of a lens driving apparatus according to an embodiment of the present application.
FIG. 1(b) is a cross sectional view taken along line A-A of the lens driving apparatus of FIG. 1(a)
FIG. 1(c) is an exploded view of the lens driving apparatus of FIG. 1(a)
Figure 1:
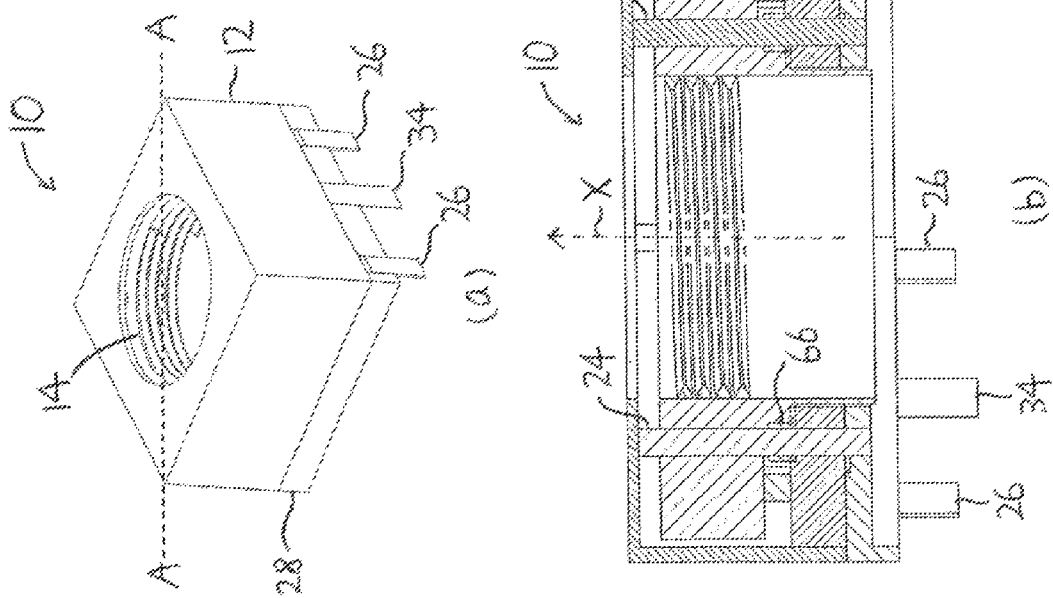
Figure 2:
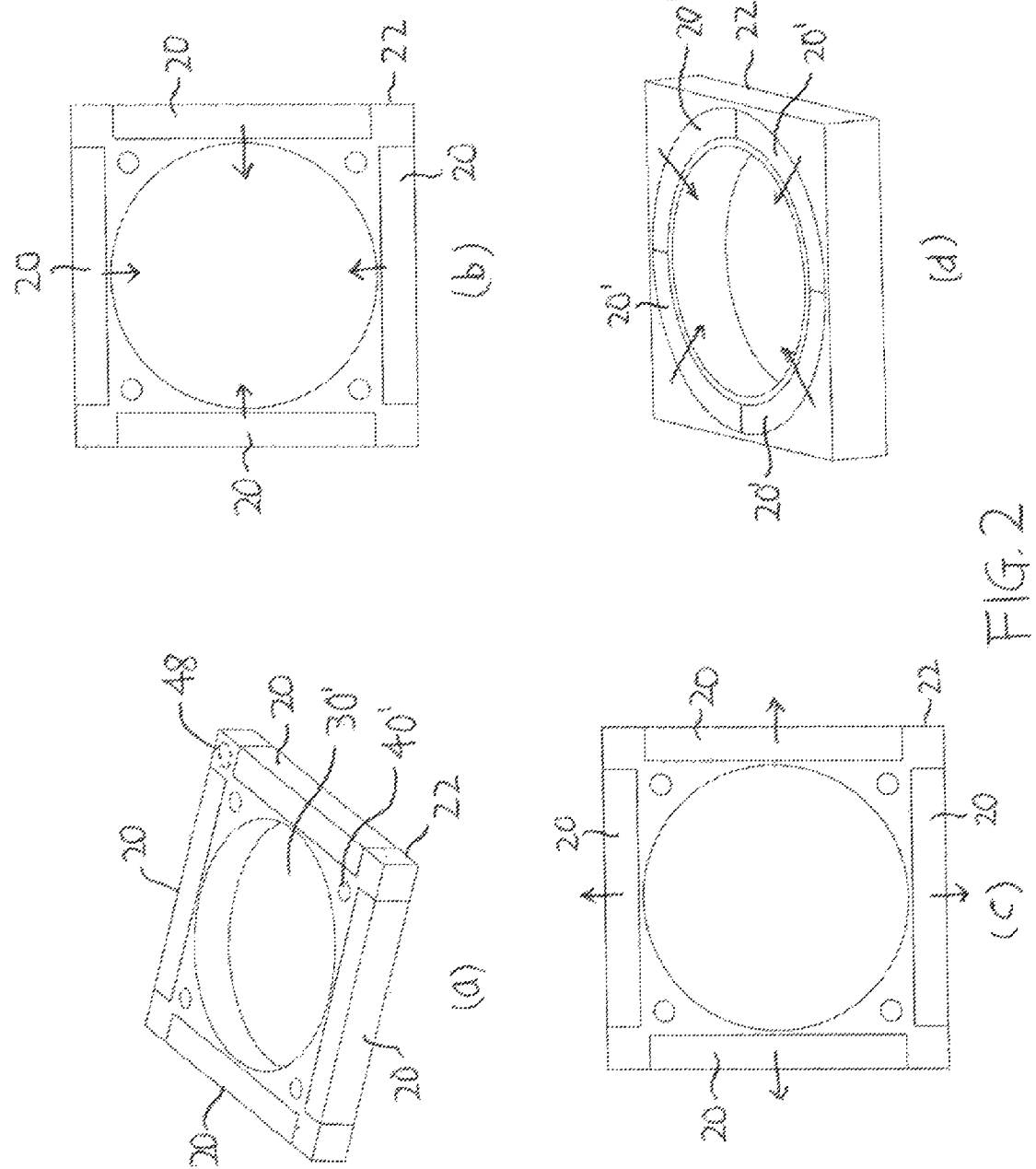
FIGS. 2(a)-(d) show the magnet holders according to some embodiments of the present application.

In the following detailed description, numerous specific details are set forth to provide a thorough understanding of claimed subject matter. However, it will be understood by those skilled in the art that claimed subject matter may be practiced without these specific. In other instances, methods, apparatuses, or systems that would be known by one of ordinary skill have not been described in detail so as not to obscure claimed subject matter.

Reference throughout this specification to "one embodiment" or an embodiment" may mean that a particular feature, structure, or characteristic described in connection with a particularly embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and", "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

As used to describe such embodiments, terms "above", "below", "upper", "lower", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is under stood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

It should be understood that the present application is not limited to the preferred embodiments described hereinabove and, needless to say, a variety of modifications or variations may be made without departing from the scope of the protection defined herein.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

FIGS. 1(a)-1(c) are different views a lens driving apparatus according to an embodiment. The lens driving apparatus 10 may include a casing 12, a lens holder 14, a hall sensor or hall element 16, a coil 18, one or more magnets 20 mounted on a magnet holder 22, a plurality of guiding shafts 24, a plurality of electrodes 26, and a base or a support 28. The base 28 can be a stationary or fixed rigid body to support various components of the lens driving apparatus 10. There may be a hollow portion 30 at the center of the base 28. Some mechanical features, namely slots or grooves 32, may be formed on the base 28 to receive the electrodes 26. A fPCB (flexible printed circuit board) electrode 34 may also be provided. Some electrodes 26 (or all) may be lying in these slots 32 and connect to some (or all) guiding shafts 24. Electric connection may be made via soldering (or apply conductive adhesive) the electrodes 26 to the guiding shafts 24, or other conductive components which are electrically connected to the shafts 24. In other embodiments, electrodes 26 may be allocated at other places rather than on the base 28. Certainly, the electrical connection method will also be subject to change accordingly.

There may be four relatively smaller guiding holes 40 formed at four corners of the base 28 surrounding the hollow portion 30. Four guiding shafts 24 may be inserted into these guiding holes 40 and can be firmly fixed within these guiding holes 40. It may not be necessary to use four guiding shafts 24 in the lens driving apparatus application. Normally, one guiding shaft may already be enough for guiding the lens holder 14 to move along the optical axis or shaft axis direction. However, in order to avoid tilting or rotating of the lens holder 14 around the shaft axis, a second shaft or a third shaft can be applied to the lens driving apparatus 10. In FIG. 1, four shafts 24 are just purely for the symmetric arrangement of the shafts 24 on the rectangular base 28. Needless to say, using 1, 2, or 3 shafts or even more shafts in the implementation does not depart from the scope of the protection defined herein.

All shafts 24 can be aligned parallel to each other and the optical axis X, which is substantially perpendicular to the top surface of the base 28. The shaft material can be conductive or non-conductive. In the case of conductive shaft, it can be used to conduct electric current to the coil 18 as described in the following description. Needless to say, the present apparatus should not be limited to the circular guiding shaft. In other embodiments, other types of guiding members or guiding mechanisms may be applied. Therefore, the term "guiding shaft" should be also understood as an alternative term to the guiding mechanism.

The hall sensor 16, which acts as a position encoder, can be installed on a top surface of the lens holder 14 to reflect the change of the position of the lens holder 14. In this implementation, the hall sensor 16 may be mounted horizontally. However, mounting the hall sensor 16 vertically can also be acceptable. In another embodiment, the hall sensor 16 can be mounted on the side wall or peripheral area of the lens holder 14. In some other embodiments, the hall sensor 16 is replaced by a position encoder or a sensor which can send out a signal to reflect the change of the position of the lens holder.

FIGS. 2(a)-2(d) are different views of the magnets 20 and magnet holder 22. Similar to the base 28, there may be a hollow portion 30' at the center of the magnet holder 22. There may also be smaller guiding holes 40' at the corners of the holder 22 surrounding the hollow portion 30'. These guiding holes 40' can also be used for receiving the guiding shafts 24. In other embodiments, these guiding holes 40' can be allocated at a corner area 48 as shown by the phantom line in FIG. 2a. Needless to say, the position of all guiding holes must be well aligned with the other respective guiding holes on the other components of the lens driving apparatus 10.

Magnets 20 can be allocated on the peripheral areas of the magnet holder 22 around the hollow portion 30'. The magnetization directions of the magnets 20 may be substantially arranged in the same plane parallel with the top/bottom surface of the magnet holder 22, which is perpendicular to the optical axis X. The magnetization directions of the magnets 20 may also be arranged in the way of pointing inwards or outwards all together as shown by the arrows in FIG. 2(b) and FIG. 2(c).

FIG. 2(d) shows another embodiment of the magnets 20 and respective magnet holder 22. For such magnet structure, a ring-shaped coil should be used and the coil holder should have respective change to hold the ring-shaped coil 18. In this embodiment, magnets 20' and magnet holder 22 may be firmly attached to the base 28 with all the guiding holes and hollow portions well aligned respectively. Each magnet 20' may be in the shape of an arc.

Figure 3:
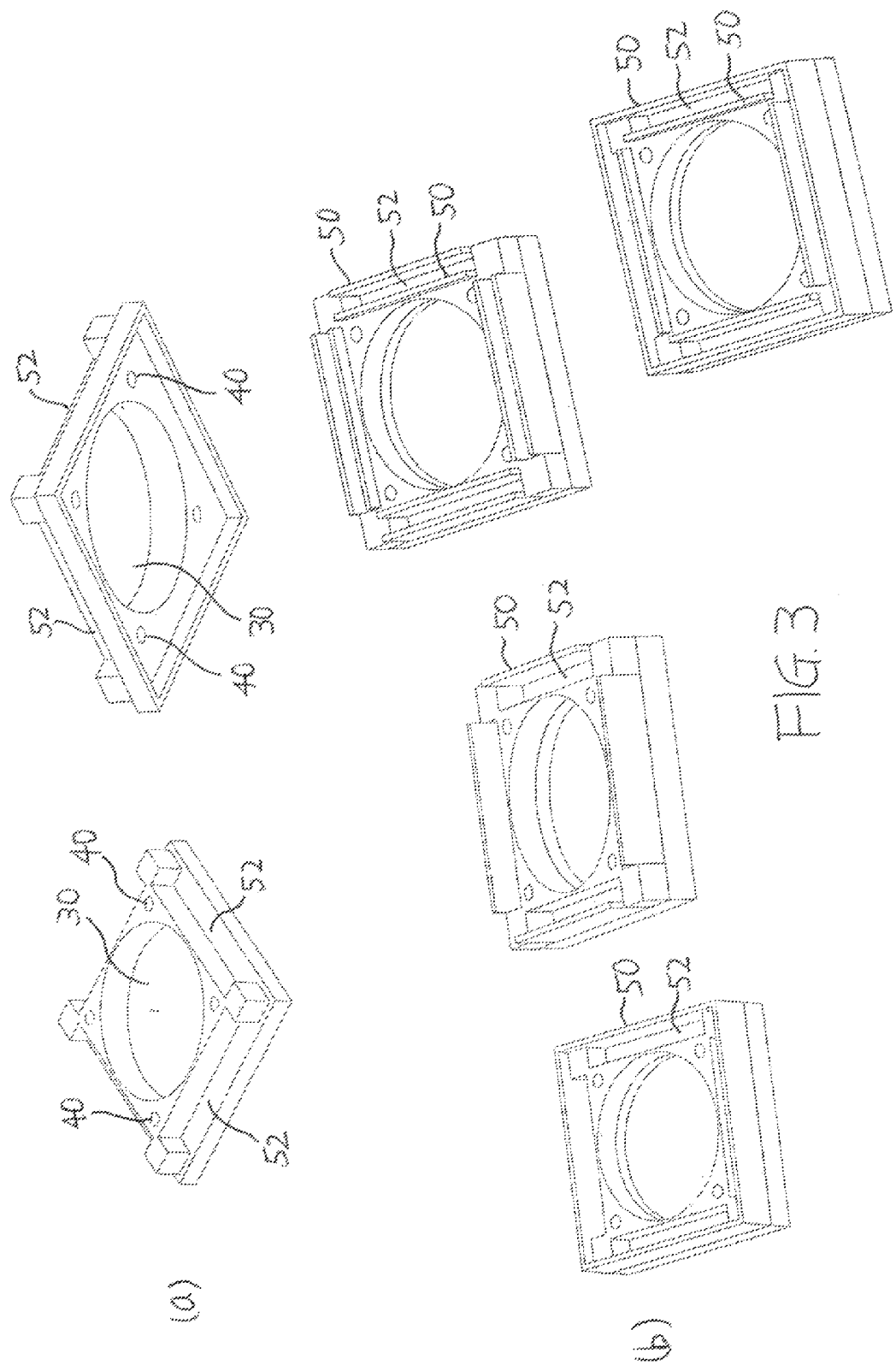
FIGS. 3(a) and 3(b) show the integrated magnet holder and base units according to some embodiments of the present application.

In another embodiment (FIG. 3(a)), the magnet holder 22 and the base 28 may be integrated into a single unit with all the necessary features. Slots 52 for receiving the magnets 20 may be formed. In another embodiment (FIG. 3(b)), the magnet holder 22 may also contain at least a yoke 50 which can be used to confine the magnetic field or flux to improve the electromagnetic force. Slots 52 for receiving the magnets 20 can be formed by the yoke(s) 50. The yoke 50 may be made of a magnetic conductive material. In another embodiment, the casing can serve as a yoke.

FIGS. 4(a)-4(d) are different views of an embodiment of the lens holder 14. The lens holder 14 may include a rectangular portion 60 and a tubular portion 62. The tubular portion 62 of the lens holder 14 may sit inside the hollow portion 30' of the magnet holder 22 and/or the hollow portion 30 of the base 28. When the lens holder 14 is driven to move, the tubular portion 62 can move freely along the optical axis X inside the hollow portions 30, 30' of the magnet holder 22 and the base 28. Similarly, there may be four small guiding holes 40" for mating precisely with the guiding shafts 24. Needless to say, the locations of the four guiding holes 40" on the lens holder 14 must align with the other guiding holes 40, 40' on the other parts respectively. There may be a smaller rectangular portion 64 locating between the tubular portion 62 and rectangular portion 60. A rectangular coil 18 can be attached firmly to the peripheral area of this smaller rectangular portion 64. In some embodiments, the shaped of the coil 18 can be circular or in the shape of a ring.

Figure 4:
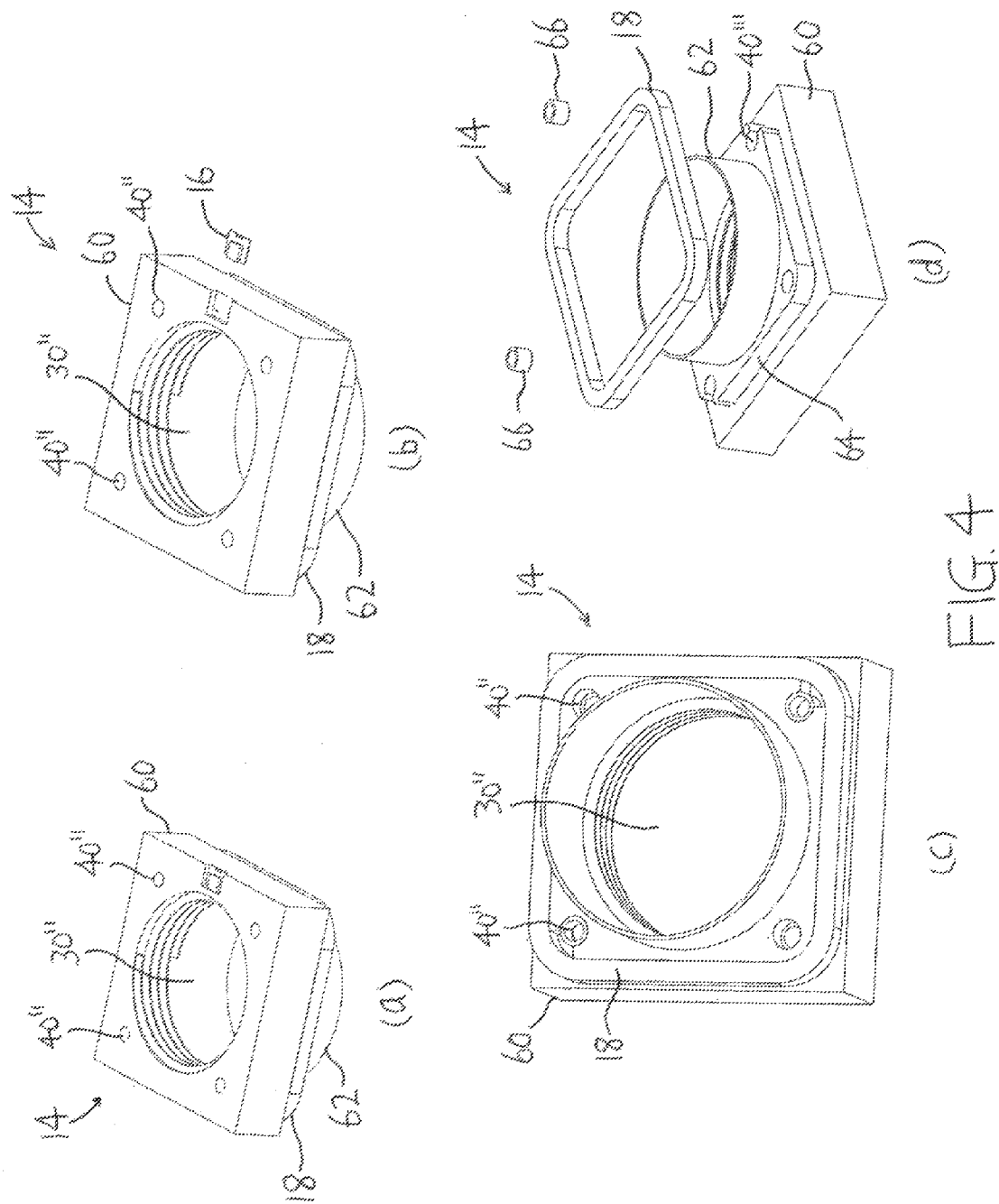
FIGS. 4(a)-4(d) are different views of a lens holder according to an embodiment of the present application.

According to one embodiment (FIGS. 4(c)-4(d)), smaller guiding holes 40'" on the smaller rectangular portion 64 may be designed to have a diameter slightly larger than the diameter of the guiding shafts 24. A conductive ring 66 can thus be inserted into and firmly fixed inside the smaller guiding holes 40' as shown in FIG. 5(a). The conductive ring 66 may be designed to have an inner diameter matched with the guiding shaft 24 so that the guiding shaft 24 can smoothly slide inside the conductive ring 66 without too much friction (FIG. 5(b)). A portion of the lens holder 14 between an inner sidewall of the guiding hole 40' and an outer sidewall of the lens holder 14 can be cut out so that a portion of an outer sidewall of the conductive ring 66 can be exposed to facilitate soldering connection of the conductive ring 66 to the coil 18 which may be mounted around the outer sidewall of the lens holder 14.

Figure 5:
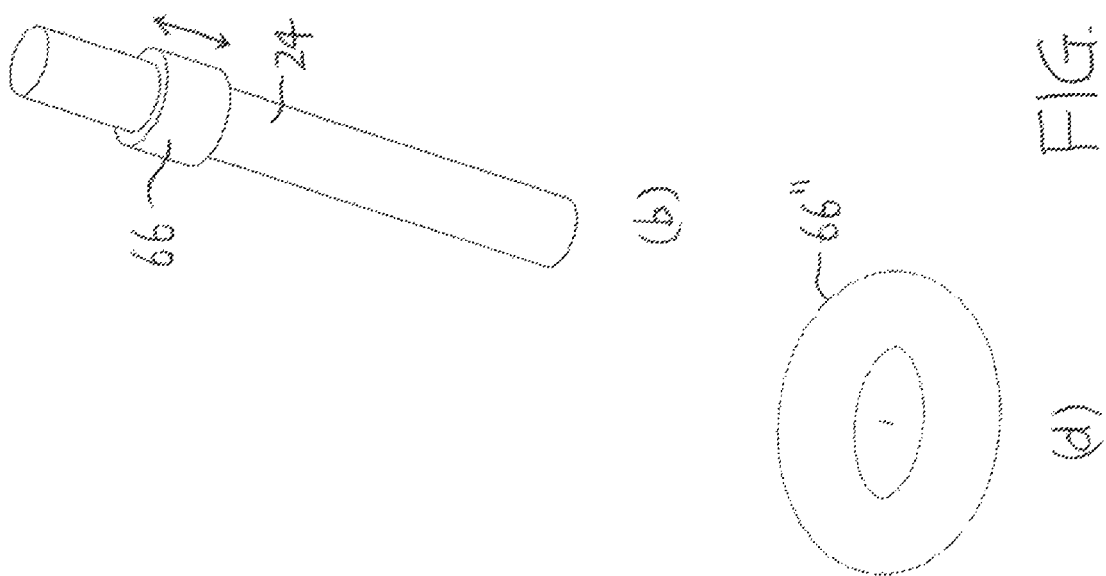
FIG. 5(a) is a cut-away enlarged view of the lens holder of FIG. 4.
FIG. 5(b) shows the sliding movement of a guiding shaft within a conductive ring.
FIGS. 5(c) and 5(d) show two other embodiments of the conductive ring.
Figure 5:
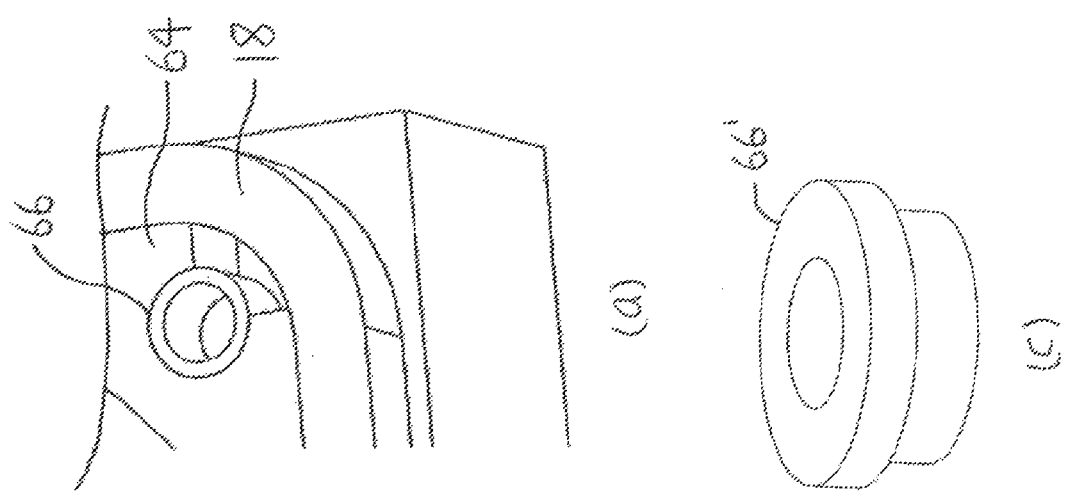

In the illustrated embodiment, a portion (e.g. a quarter) of the smaller guiding holes 40'" on the smaller rectangular portion 64 may be cut away so that a portion (e.g. a quarter) of the conductive ring 66 can be exposed to the outside world. The wire leads of the coil 18 can be soldered on this exposed portion of the conductive ring 66 so as to make electrical connection to the electrode 26 through the guiding shafts 24. The conductive ring 66 may be cylindrical in shape. In some other embodiments, the conductive ring 66' may be in the shape of a cylinder having outwardly extending flange formed at one end thereof as shown in FIG. 5(*c*), and the conductive ring 66" may be in the shape of a donut as shown in FIG. 5(*d*).

Figure 6:
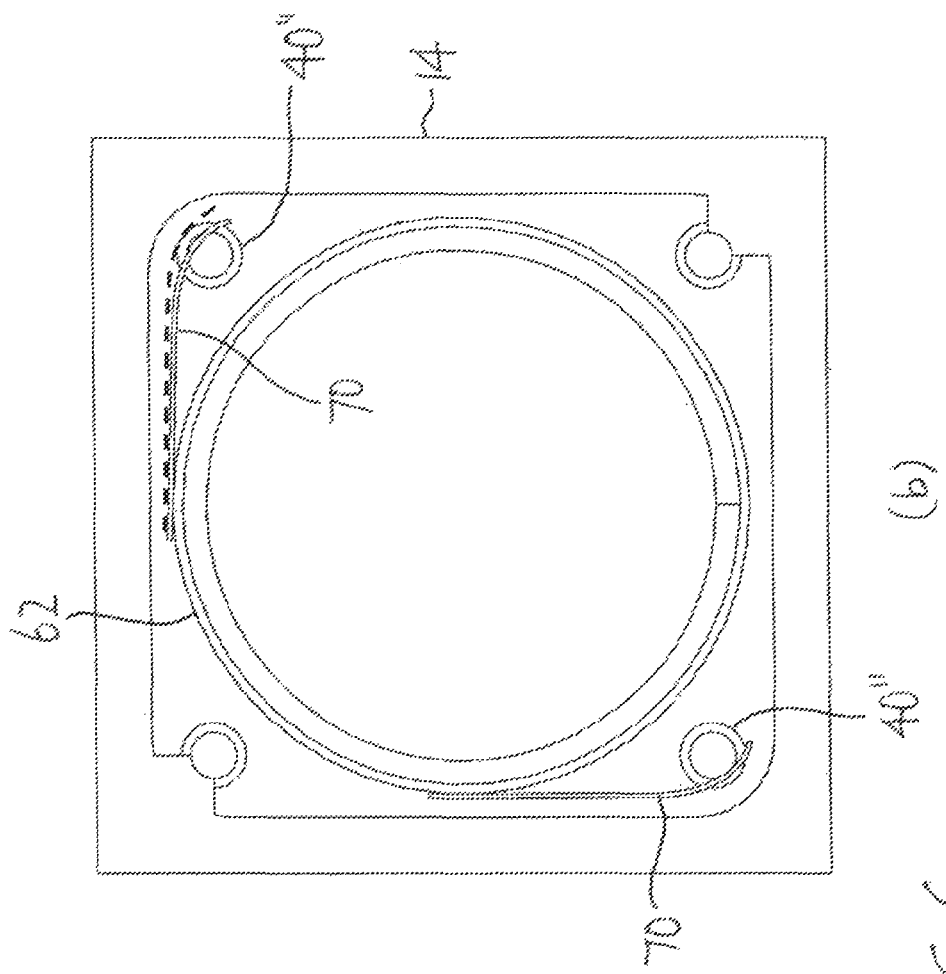
FIGS. 6(a) and 6(b) show two different views of the lens holder having two resilient conductive brushes provided thereon.
Figure 6:
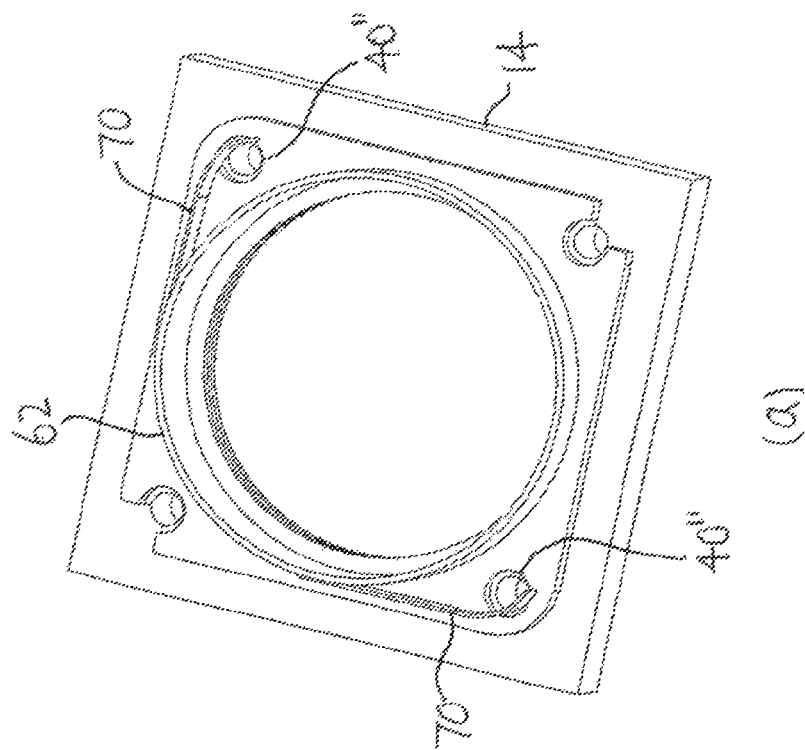

Beside the conductive ring 66, in another embodiment (FIGS. 6(*a*)-6(*b*)) one or more resilient conductive electrodes 70 can be installed on the lens holder 14. This resilient electrode or brush 70 can act like an electrical brush in a traditional rotary motor. It can tightly contact the guiding shaft 24 by resilient force. FIG. 6(*b*) shows the position of the resilient brush 70 before the shaft 24 is inserted into the guiding hole 40". The dotted line shows the position of the deformed or bent resilient brush 70 after the shaft 24 is inserted into the guiding hole 40". In the present embodiment, one end of the resilient brush 70 can be installed on a wall of the tubular portion 62 perpendicular to the lens holder 14. It is understood that the resilient brush 70 can be installed on any portion of the lens holder 14 as long as the resilient brush 70 can tightly contact the guiding shaft 24.

Figure 7:
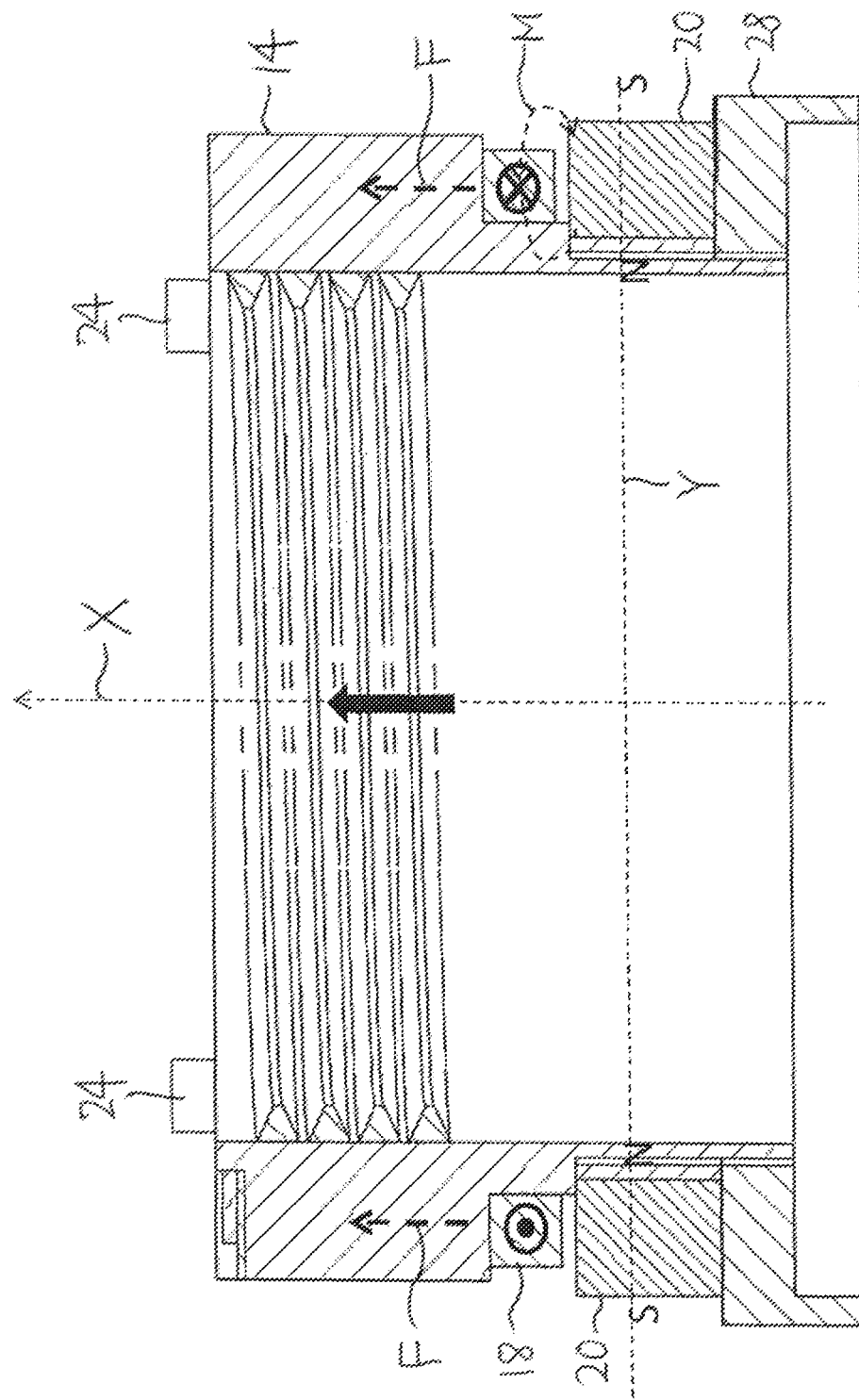
FIG. 7 is a cross sectional view of the lens driving apparatus showing its working mechanism.

FIG. 7 is a cross sectional view of the lens driving apparatus 10 to explain the working mechanism of the apparatus. The magnetization directions of the magnets 20 can be all parallel with a plane Y that is perpendicular to the optical axis X or the lens holder moving direction or the optical axis direction. The coil 18 can be directly put on top of the magnets 20 between the N and S poles as shown in the figure. Therefore, the magnetic flux passing through the coil 18 can be substantially perpendicular to the coil 18 or the current direction. According to the right-hand rule, the electromagnetic force generated on such situation can be pointing up or down with respect to the current direction. The electromagnetic force can be directly transferred to the lens holder 14 as the coil 18 can be firmly fixed on the lens holder 14. The lens holder 14 can then move up or down according to the current direction. The moving direction of the lens holder 14 can be precisely controlled by the guiding shafts 24 or guiding mechanism.

During the movement of the lens holder 14, the hall sensor 16 will sense a variation of the magnetic field, thus changing the output signal. This signal can therefore reflect the lens holder position after a careful and precise calibration. Therefore, to drive a lens or the lens holder 14 to the expected position, one can apply the current to the coil 18 and monitor the output signal of the hall sensor 16. Once the signal of hall sensor 16 indicates the arrival of the lens holder 14 to the expected position, the electric current will be stopped. Certainly, the real implementation of the electric current control will be more complicated. Once the electric current stops, the lens holder 14 will immediately stop at the place where it is because of the friction generated by the physical contact between the lens holder 14 and shafts 24.

Friction is the main cause of holding the lens holder 14 at the position without current. If the friction is too large, the current needed (or electric power needed) to drive the lens holder 14 will be too large. If the friction is too small, it cannot resist the weight of the lens holder 14 and thus the lens cannot stay at the position where it should be.

Figure 8:
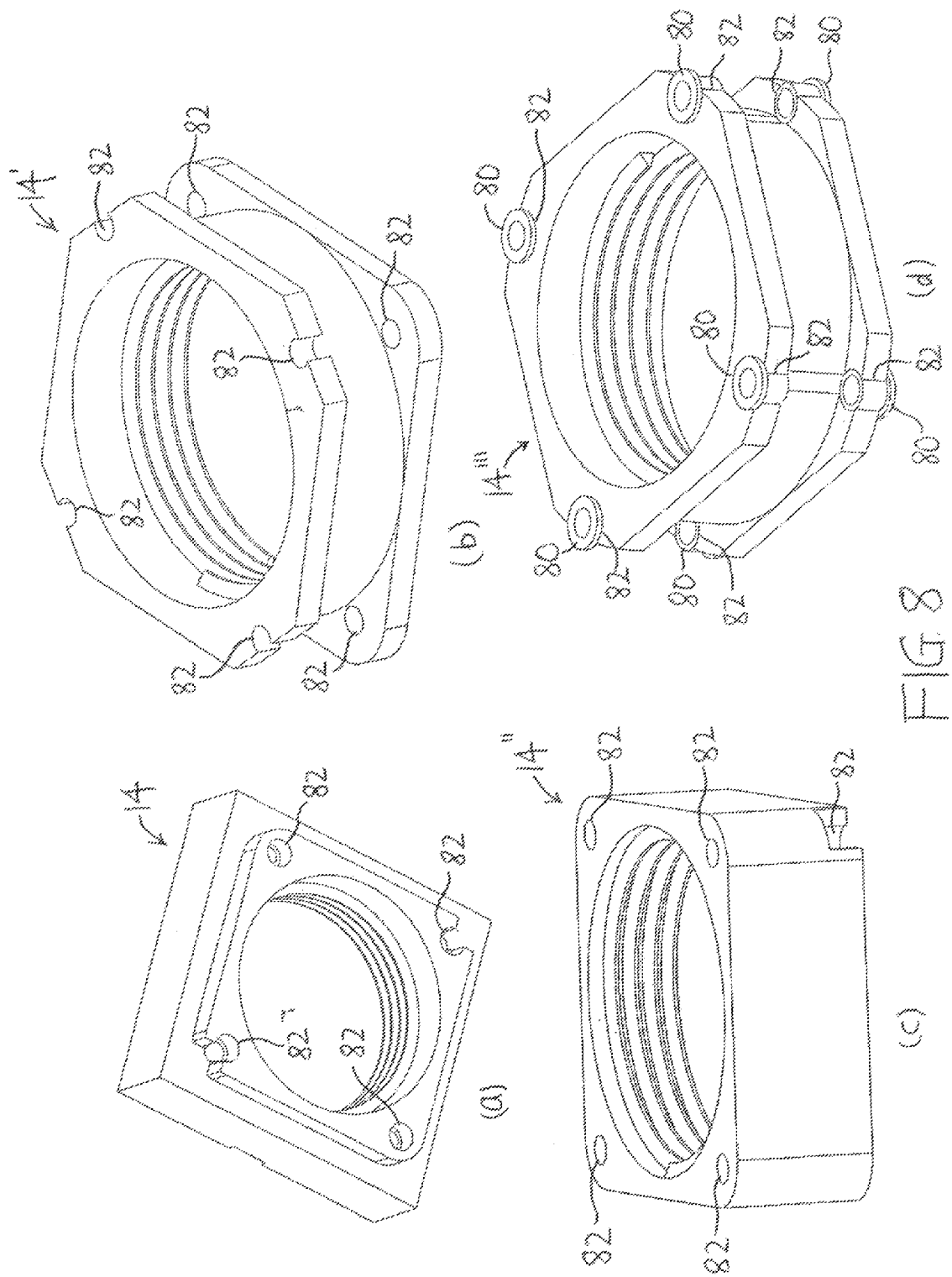
FIGS. 8(a)-8(d) show four other embodiments of the lens holders.

FIGS. 8(*a*)-8(*d*) show some perspective views of various implementation of the lens holder 14. FIGS. 8 (*a*), (*b*) and (*c*) are trying to cut out unnecessary portion of the lens holder 14, 14' and 14" to reduce the weight thereof. Smaller or lighter lens holder 14 will help to reduce the electric current or power needed to drive a lens holder 14. It will also help to save material cost as less material is needed. FIG. 8(*b*) shows an implementation which tries to reduce the contact area of the lens holder 14' and shafts 24 while without losing guiding preciseness. FIG. 8(*d*) shows another implementation of the lens holder 14'''. Connection rings 80 may be introduced into the lens holder 14''' and inserted into guiding holes 82. These connection rings 80 can be firmly fixed on the lens holder 14' and their inner diameters perfectly match with the guiding shafts 24 or guiding mechanism. The connection rings 80 can be made of low-friction material, which has a low friction coefficient. The connection ring 80 can be coated with a low-friction layer to reduce the friction between the lens holder 14' and guiding shaft 24 or guiding mechanism. Certainly, selection of the connection ring material or low-friction coating material should match with guiding shaft materials or guiding mechanism materials, which can be conductive or non-conductive materials. Furthermore, the connection ring material can be a low-friction and conductive material. Moreover, in some embodiments, lubricants are applied to the contact surface or contact point of the guiding features to reduce the friction.

Figure 9:
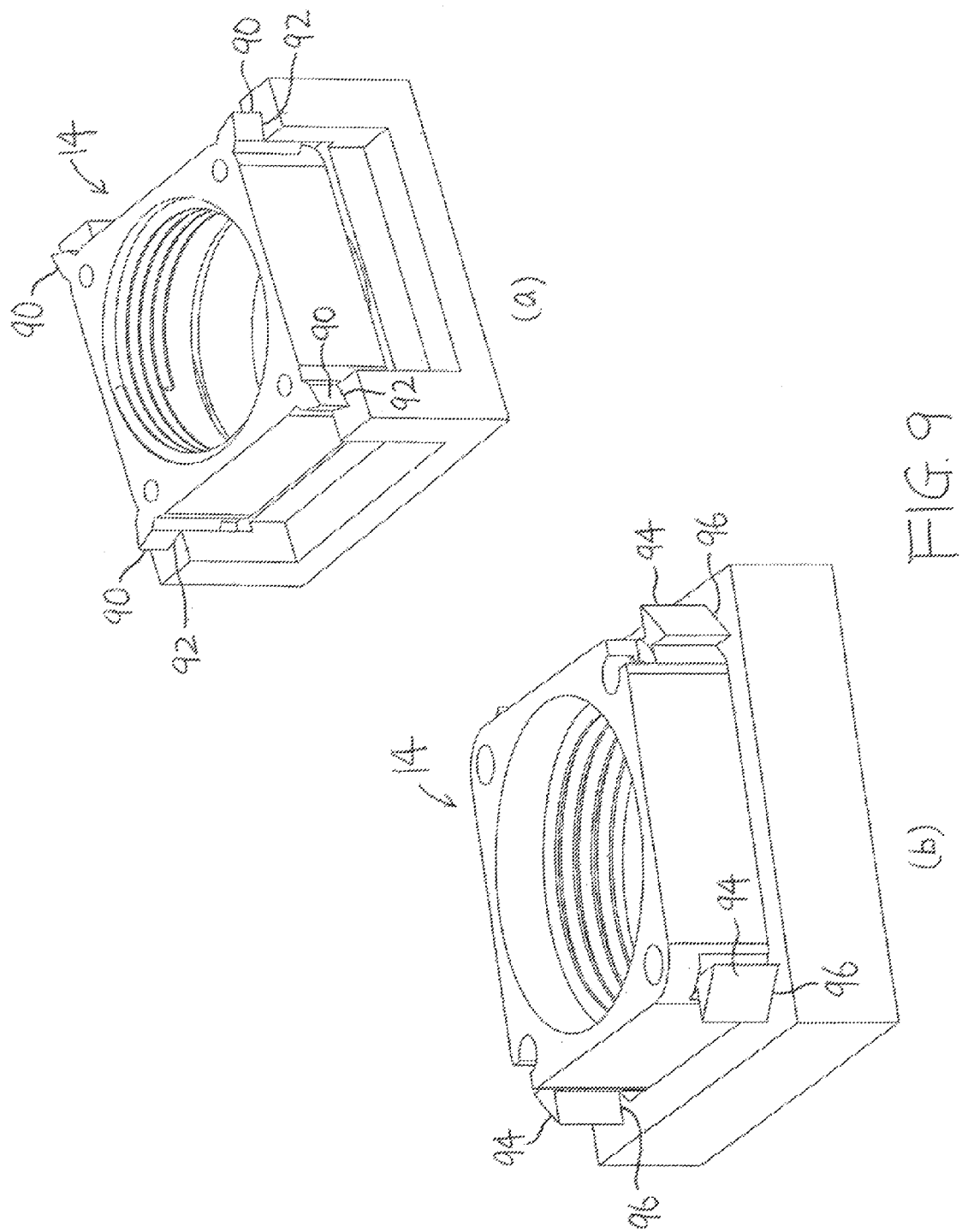
FIGS. 9(a)-9(b) show two other embodiments of the guiding mechanism.

FIGS. 9(*a*) and 9(*b*) are perspective views of various guiding mechanisms. FIG. 9(*a*) shows a V-groove type guiding mechanism which includes a V-shaped elongated projection 90 slidable along a V-shaped groove 92. FIG. 9(*b*) shows a dovetail groove type guiding mechanism which includes a dovetail-shaped elongated projection 94 slidable along a dovetail-shaped groove 96.

It is understood that four guiding mechanisms are not necessary. The point is that at least one guiding mechanism can be used to guide the lens holder 14 movement direction. The fixed part of the guiding mechanism can be installed firmly on the base 28, the magnet holder 22, or an integrated base and magnet holder unit, or the like. The moving part of the guiding mechanism can be installed or attached firmly to the lens holder 14. To reduce the friction, ball bearing can be installed onto the fixed part or moving part of the guiding mechanism.

Although the guiding mechanisms shown in FIG. 9 are all integrated with the lens holder 14 to form a complete single unit, the guiding features can be an external part attached to the lens holder 14.

In all cases, the guiding mechanism can be composed of material different from that of the lens holder 14. The guiding mechanism can be coated with a layer of low-friction material. The guiding mechanism can also use conductive material for electrical connection or coated with a conductive layer. Lubricants can also be applied to the guiding mechanism to reduce the friction and thus to reduce the electrical current needed to drive the lens driving apparatus.

Although it is not shown in the figures, it is understood that there are many other types of grooves that can be used as guiding mechanism, such as arc shape, rectangular shape, cylindrical shape, any other male-female mating parts, or the like.

In some embodiments, the hall sensor 16 or position encoder may be mounted on the fixed portion of the lens driving apparatus 10. In such embodiment, the magnets 20 can be mounted on the lens holder.

Figure 10:
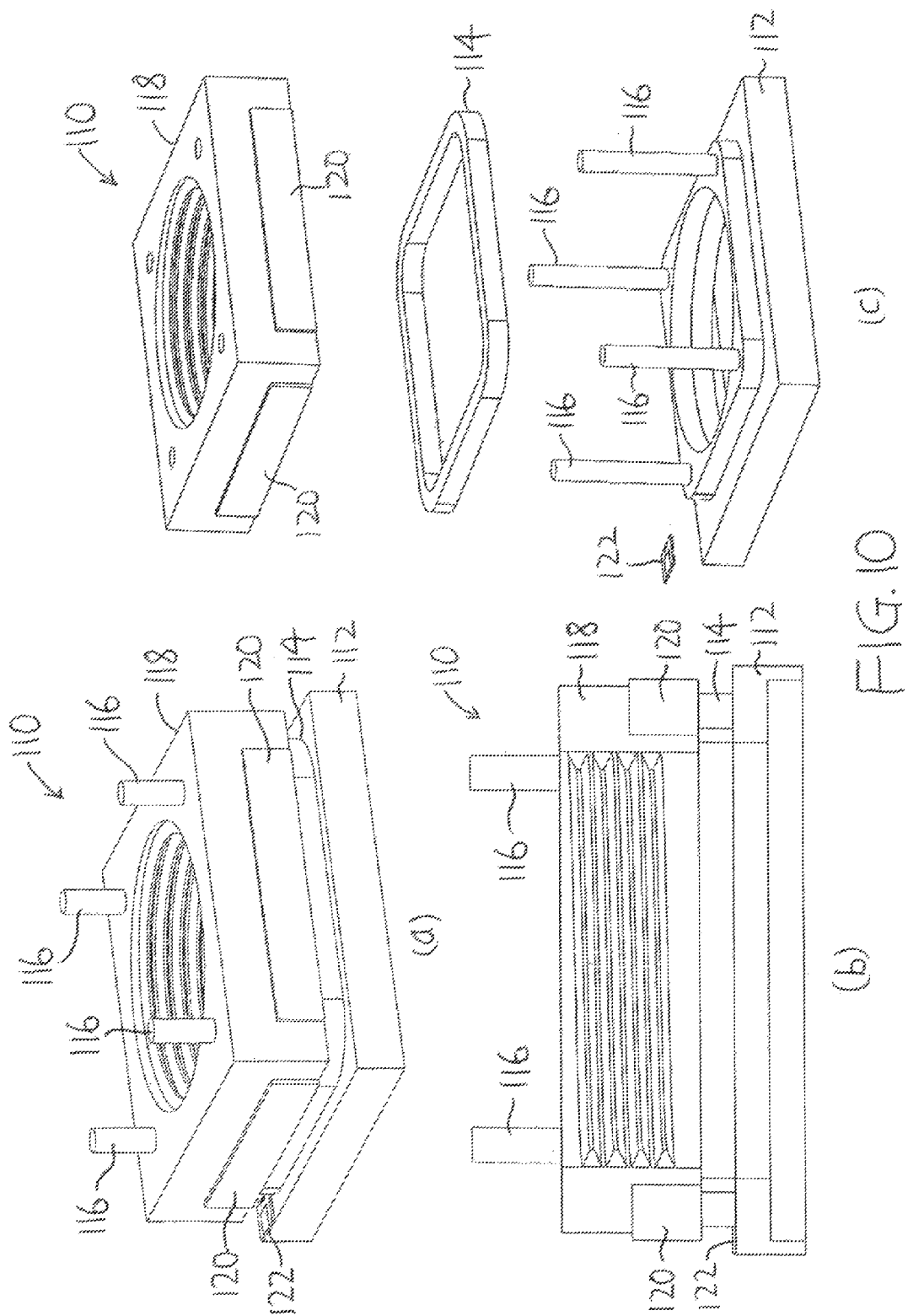
FIGS. 10(a)-10(c) are different views of another embodiment of the lens driving apparatus.

FIG. 10 is a perspective view of a lens driving apparatus according to another embodiment. The lens driving apparatus 110 may include a base 112, a coil 114, four guiding shafts 116, a lens holder 118 having a plurality of magnets 120, and a hall sensor 122 mounted on the base 112. The base 112 can be a rigid body providing solid mechanical support to the other components of the lens driving apparatus 110. There may be a hollow portion at the center of the base 112. The coil 114 can be firmly attached to the base 112.

In some other embodiments, the portion of the base 112 holding the coil 114 can be separated from the base 112 and forms an individual component, namely a coil holder. Such separated coil holder design is particularly good for panelization of the individual component and batch processing.

The four guiding shafts 116 may be rigidly installed on the base 112. It is not necessary to use four guiding shafts 116 in the lens driving apparatus application. Normally, one guiding shaft is already enough for guiding the lens holder 118 to move along the shaft's axis direction. However, in order to avoid tilting or rotating of the lens holder 118 around the shaft axis, a second shaft or a third shaft can be applied to the lens driving apparatus 110. In FIG. 10, four shafts 116 are just purely for the symmetric arrangement of the shafts 116 on the rectangular base 112. It is understood that using 1, 2, or 3 shafts or even more shafts in the implementation does not depart from the scope of the protection defined herein. All shafts can be aligned parallel to each other and the optical axis, which is substantially perpendicular to the top surface of the base 112. It is understood that the present application should not be limited to circular guiding shaft. In other embodiments, other types of guiding mechanisms can be applied. Therefore, the term "guiding shaft" should be also understood as an alternative term to the guiding mechanism.

The magnets 120 can be firmly attached to the lens holder 118. In some other embodiments, the portion of the lens holder 118 holding the magnets 120 can be separated from the base 112 and forms an individual component, namely a magnet holder. Such separated magnet holder design is particularly good for panelization of the individual component and batch processing. The magnetization of the magnet can be the same as described in FIG. 2. All the descriptions describing lens holder and magnet holder in the previous embodiment can all apply to the lens holder of this embodiment. For example, the lens holder 118 can also contain a tubular portion extending from the magnet holder portion. This tubular portion may also be moving into the hollow portion of the base 112 during lens holder movement.

The hall sensor 122 may be installed on the top surface of the base 112. In this implementation, the hall sensor 122 can be mounted horizontally. However, mounting the hall sensor 122 vertically is also acceptable. In another embodiment, the hall sensor 122 can be mounted on the side wall or peripheral area of the lens holder 118. There are many other places where the hall sensor 122 can be installed. In one embodiment, the hall sensor 122 can be installed on the bottom surface of the base 112. The bottom surface is actually the outer face of the lens driving apparatus 110. Such design is particularly good for improving the lens driving apparatus quality and consistency. Since the hall sensor 122 is a semiconductor device, its performance or parameters is varying from piece to piece. If the hall sensor 122 is installed inside the lens driving apparatus 110, it is difficult to change the hall sensor 122 if the hall sensor 122 fails, is poor, or is out of order. Normally such replacement will damage the other portion of the lens driving apparatus 110 and create a lot of material waste or lost. On the contrary, if the hall sensor 122 can be installed on the outer surface of the lens driving apparatus 110, a low quality hall sensor can be easily replaced by a good one without damaging the other portion of the lens driving apparatus.

The lens driving apparatus of the present application can be incorporated into any image-capturing electronic devices such as cameras, video recorders, and mobile phones, etc.

While there has been illustrated and described what are presently considered to be example embodiments, it will be understood by those skilled in the art that various other modifications may be made, and equivalents may be substituted, without departing from the central concept described herein. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A lens driving apparatus comprising:
   (a) a base having at least one stationary guide member;
   (b) a moveable guide member provided on and moveable with a lens holder;
   (c) a coil attached to the lens holder;
   (d) a magnet holder holding a plurality of magnets with magnetization direction lying on a plane perpendicular to an optical axis defined by the lens holder; and
   (e) a position encoder attached to the lens holder;
   (f) wherein the said magnet holder is fixed on the said base, and the said moveable guide member on the said lens holder is engaged with the stationary guide member on the said base, and slidable therealong in a direction defined by the guide members; and
   (g) wherein the said position encoder is configured to send out a signal with respect to the change of the position of the lens holder.

2. A lens driving apparatus comprising:
   (a) a support;
   (b) a lens holder engaged with the support through a guide mechanism and moveable along an optical axis;
   (c) a stationary guide member of the guide mechanism provided on the support;
   (d) a moveable guide member of the guide mechanism provided on and moveable with the lens holder, the moveable guide member being engaged with the stationary guide member and slidable therealong; and
   (e) a position encoder to reflect the change of the position of the lens holder;
   (f) wherein a coil is mounted on the lens holder and a plurality of magnets is mounted on the support.

3. The lens driving apparatus as claimed in claim 2, wherein the said stationary guide member is a guiding shaft having one end attached to the support, and the said moveable guide member is a guiding hole formed on the lens holder through which the guiding shaft slides.

4. The lens driving apparatus as claimed in claim 3, wherein a portion of the lens holder between an inner sidewall of the guiding hole and an outer sidewall of the lens holder is cut out to reduce the contact area between the guiding hole and the guiding shaft, reduce the weight of the lens holder, and hence reduce electric current needed to drive the lens holder.

5. The lens driving apparatus as claimed in claim 2, wherein the moveable and stationary guide members comprise an elongated projection and a mating groove.

6. The lens driving apparatus as claimed in claim 5, wherein the elongated projection and the groove have V-shaped cross section.

7. The lens driving apparatus as claimed in claim 5, wherein the elongated projection and the groove have dovetail-shaped cross section.

8. The lens driving apparatus as claimed in claim 2, wherein the stationary guide member is a central cylindrical bore formed on the support, and the moveable guide member is a tubular portion provided on the moveable lens holder.

9. The lens driving apparatus as claimed in claim 2, wherein the plurality of magnets has magnetization direction lying on a plane perpendicular to the optical axis, and the coil is disposed adjacent and parallel to the magnets, whereby electromagnetic force is generated to drive the lens holder upwards or downwards along the optical axis.

10. The lens driving apparatus as claimed in claim 9, comprising four magnets disposed respectively along four sides of a rectangular magnet holder.

11. The lens driving apparatus as claimed in claim 9, wherein the plurality of magnets is disposed in a circular configuration, each magnet being in the shape of an arc.

12. The lens driving apparatus as claimed in claim 9, wherein the moveable guide member is a conductive ring being fixed in a guiding hole formed on the lens holder, and the stationary guide member is a conductive shaft having one end connected to an electrode mounted on the support and the other end received in the conductive ring which in turn is connected to the coil.

13. The lens driving apparatus as claimed in claim 12, wherein a portion of the lens holder between an inner sidewall of the guiding hole and an outer sidewall of the lens holder is cut out so that a portion of an outer sidewall of the conductive ring is exposed to thereby facilitate soldering connection of the conductive ring to the coil mounted around the outer sidewall of the lens holder.

14. The lens driving apparatus as claimed in claim 12, further comprising a resilient conductive electrode, one end of the resilient conductive electrode being fixedly attached to a vertical wall formed perpendicularly on the lens holder, and the other end is a free end adapted to be bent away from the guiding hole after the conductive shaft is inserted therein, and bias against the conductive shaft by a biasing force generated by the bent resilient conductive electrode.

15. The lens driving apparatus as claimed in claim 12, wherein the conductive ring is cylindrical in shape.

16. The lens driving apparatus as claimed in claim 12, wherein the conductive ring is cylindrical in shape with an outwardly extending annular flange formed at one end thereof.

17. The lens driving apparatus as claimed in claim 12, wherein the conductive ring is in the shape of a donut.

18. The lens driving apparatus as claimed in claim 2, wherein a plurality of magnets is mounted on one of the lens holder and the support, and the position encoder is mounted on the other one of the lens holder and the support for close loop control of the movement of the lens holder.

19. An electronic image-capturing device comprising the lens driving apparatus claimed in claim 2.

* * * * *